(12) United States Patent
Hernacki

(10) Patent No.: US 7,792,994 B1
(45) Date of Patent: Sep. 7, 2010

(54) CORRELATING NETWORK DNS DATA TO FILTER CONTENT

(75) Inventor: Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1012 days.

(21) Appl. No.: 11/153,892

(22) Filed: Jun. 15, 2005

(51) Int. Cl.
G06F 15/16 (2006.01)
(52) U.S. Cl. .................................. 709/245; 709/229
(58) Field of Classification Search .............. 709/245, 709/229
See application file for complete search history.

(56) References Cited

U.S. PATENT DOCUMENTS 5,805,820 A * 9/1998 Bellovin et al. ............. 709/225
6,262,987 B1 * 7/2001 Mogul ........................ 370/400
6,321,267 B1 * 11/2001 Donaldson .................. 709/229

* cited by examiner

Primary Examiner—Jeffrey Pwu
Assistant Examiner—Shripal K Khajuria
(74) Attorney, Agent, or Firm—Hunton & Williams, LLP

(57) ABSTRACT

Correlating network DNS data to filter content is disclosed. In one embodiment, a DNS request made by an internal host in a network to obtain an IP address and the corresponding response from a DNS server are intercepted and cached. By caching the DNS request and the corresponding response, the IP address the host thinks is associated with the domain name, URI, or other identifier for which the corresponding IP address was requested from the DNS server is known. When the host subsequently uses the IP address to open a TCP (or TCP/IP) connection, the IP address is mapped to the corresponding domain name in the cache and it is determined whether the domain name is in a block list.

30 Claims, 8 Drawing Sheets

| DOMAIN NAME | IP ADDRESS | TTL |
|---|---|---|
| www.bannedpage.com | 62.213.132.89 | 13h |
| www.ip-patent.com | 192.168.168.1 | 24h |
| www.prohibitedsite.com | 63.215.198.31 | 4h |
| www.symantec.com | 206.204.52.54 | 48h |
| ⋮ | ⋮ | ⋮ |

FIG. 2

CORRELATING NETWORK DNS DATA TO FILTER CONTENT

BACKGROUND OF THE INVENTION

Content filters exist for a variety of different network applications. They are often deployed to enforce a local policy that specifies what types of content local users are permitted to access. For example, content filters are commonly used to filter access to websites (i.e. www/http). They may be deployed in organizations such as schools, libraries, hotels, government offices, Internet cafes, corporations, and even in private homes to filter out content considered undesirable (e.g., political content, hate groups, pornography, etc.) by the local administration.

Existing web content filters are typically based on the site or domain name. Often the provider of a content filtering technology will provide a list of prohibited sites. Better implementations provide a list of categorized sites (e.g., cults, pornography, violence, hate groups, etc.) and allow the local administrator to decide which categories to ban. Some implementations allow or require the administrators to add and/or create a list of sites to block access to. These lists are typically specified in terms of domain names or uniform resource identifiers (URI) instead of internet protocol (IP) addresses for a variety of reasons, e.g., because IP addresses can be reassigned, change, be associated with both prohibited and permitted content, etc.

One of the difficulties in enforcing such a policy, however, is that the enforcement point does not see the domain name that a user is attempting to access. For example, a transmission control protocol (TCP) connection request to 63.215.198.31:80 is detected. A typical content filter notes that this is a web connection (port 80) and validates it against its blocking list. However, since its list is in domain name form, it must first determine the domain name associated with this IP address. A typical filter queries a domain name system (DNS) server to resolve the IP address into a domain name and receives a response back providing the name associated with the IP address by the DNS. However; DNS resolution is not guaranteed to be circular. That is, while www.prohibitedsite.com may resolve to IP address 63.215.198.31, IP address 63.215.198.31 may not resolve back to www.prohibitedsite.com. It may resolve back to something like 1-2-3-4-dsl.pacbell.com. If the "reverse resolution" (IP address to domain name) is not circular, the filter will receive a name that is different than what the user attempted to access. If this other name is not also in the filter block list, access will be allowed.

To overcome this potential lack of circular resolution, some existing content filter providers include IP addresses in addition to the domain name in their content filter block lists. However, since the IP address associated with a web site may change, lookups need to be performed periodically so that a current IP address is associated with each domain name in the block list. Since it is prohibitive for all clients (or even all gateways) in a network to constantly attempt to resolve the entire list to keep an up-to-date IP address list, such lookups are performed centrally, and frequent updates are provided to the clients. While this improves the situation by shrinking the possible window of difference, it does not eliminate it. Even if lookups and updates of the IP addresses of all the sites in the content filter block list can be performed in zero time, the latency and cost required to send updates to the clients makes constant updates impractical.

In some content filters, layer 7 (L7) protocol hints are utilized to determine the URI that a user is attempting to access. Specifically, an HTTP GET request header may include the URI, and this URI may be matched against the block list of the content filter to determine whether it is prohibited. The extracted URI, however, is useful to the content filter only if it is unencrypted. In addition, all protocols do not support the inclusion of the URI in L7 headers.

Thus, there is a need for more robust and efficient content filters.

BRIEF DESCRIPTION OF THE DRAWINGS

Various embodiments of the invention are disclosed in the following detailed description and the accompanying drawings.

FIG. 2 illustrates an embodiment of a DNS cache.

DETAILED DESCRIPTION

Figure 1A:
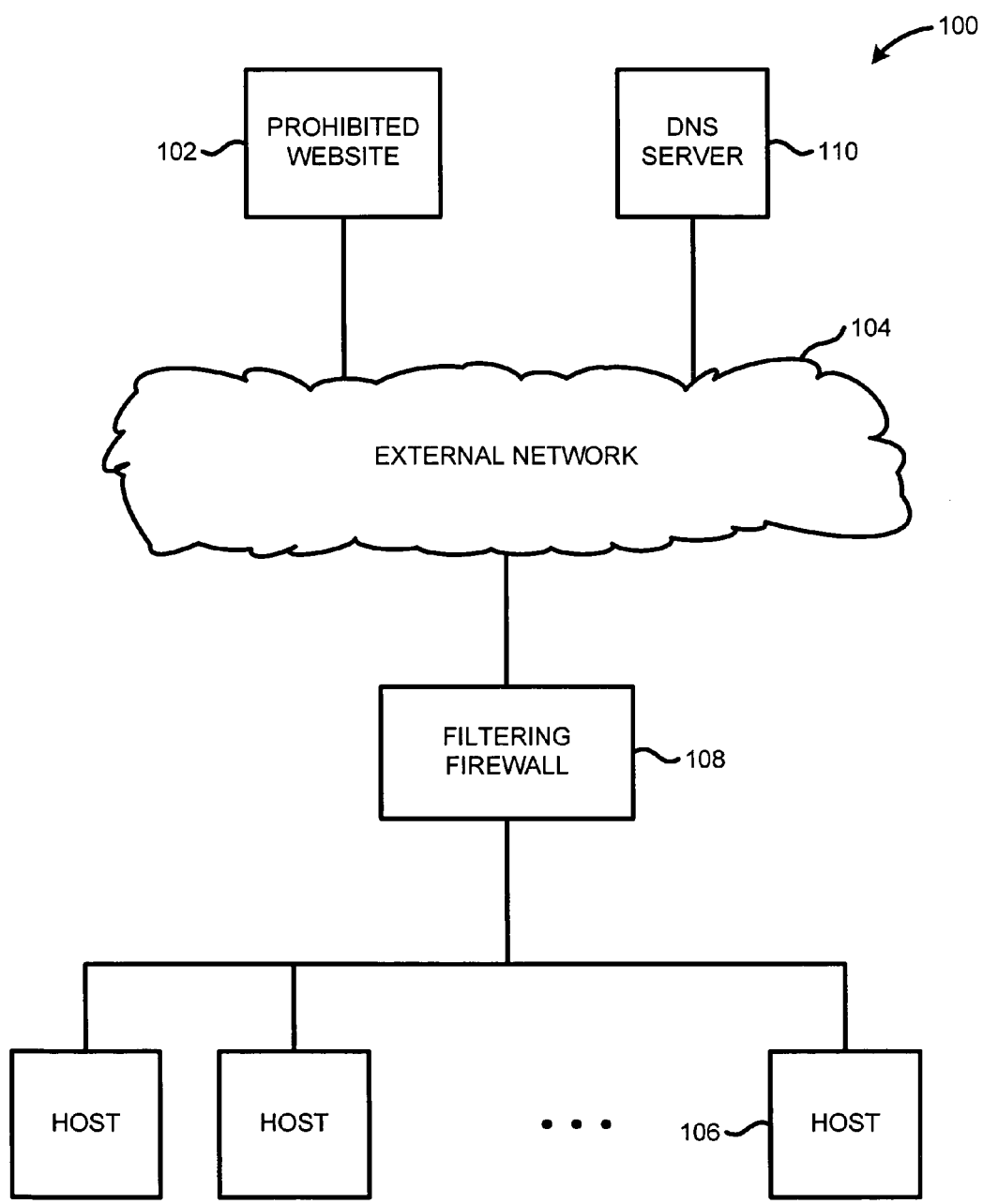
FIG. 1A illustrates an embodiment of a content filter deployed at the firewall of an internal network.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Correlating network DNS data to filter content is disclosed. Specifically, a precursor DNS request made by an internal (or other protected) client or host in a network to obtain an IP address associated with an identifier, e.g., a domain name or URI, associated with a destination to which the client or host desires to connect, e.g., because a user has typed the identifier into a web browser, and the corresponding response from a DNS server are intercepted and cached by a content filter deployed either on the host and/or at a network perimeter such as a firewall. By caching the DNS request and the corresponding response, the content filter knows what IP address the host thinks is associated with the domain name, URI, or other identifier for which the corresponding IP address was requested from the DNS server. When the host subsequently uses the IP address corresponding to the desired domain name to open a TCP (or TCP/IP) connection, the content filter can map the IP address to the corresponding domain name in the cache and check whether the domain name is in the block list. Thus, the content filter can accurately determine what web site a host is attempting to access based on the observed connection request while operating with only a domain name-based (or other non-IP address identifier based, e.g., URI, URL, etc.) block list. In addition, the content filter does not generate additional DNS traffic since the content filter does not have to perform its own reverse lookup on any IP address.

FIG. 1A illustrates an embodiment of a content filter deployed at the firewall of an internal network. In the example shown, network environment 100 includes a prohibited website 102 connected to an external network 104. A secured network including a plurality of internal hosts, such as internal host 106, is connected to external network 104 via filtering firewall 108. DNS server 110 is also connected to external network 104. The boundary of the secured internal network is defined by filtering firewall 108. Filtering firewall 108 includes content filtering technologies (e.g., those employed in a Symantec Gateway Server™) that prohibit internal hosts in the secured network from accessing prohibited websites, such as prohibited website 102. Prohibition of certain web sites is determined by a local administrative policy.

Figure 1B:
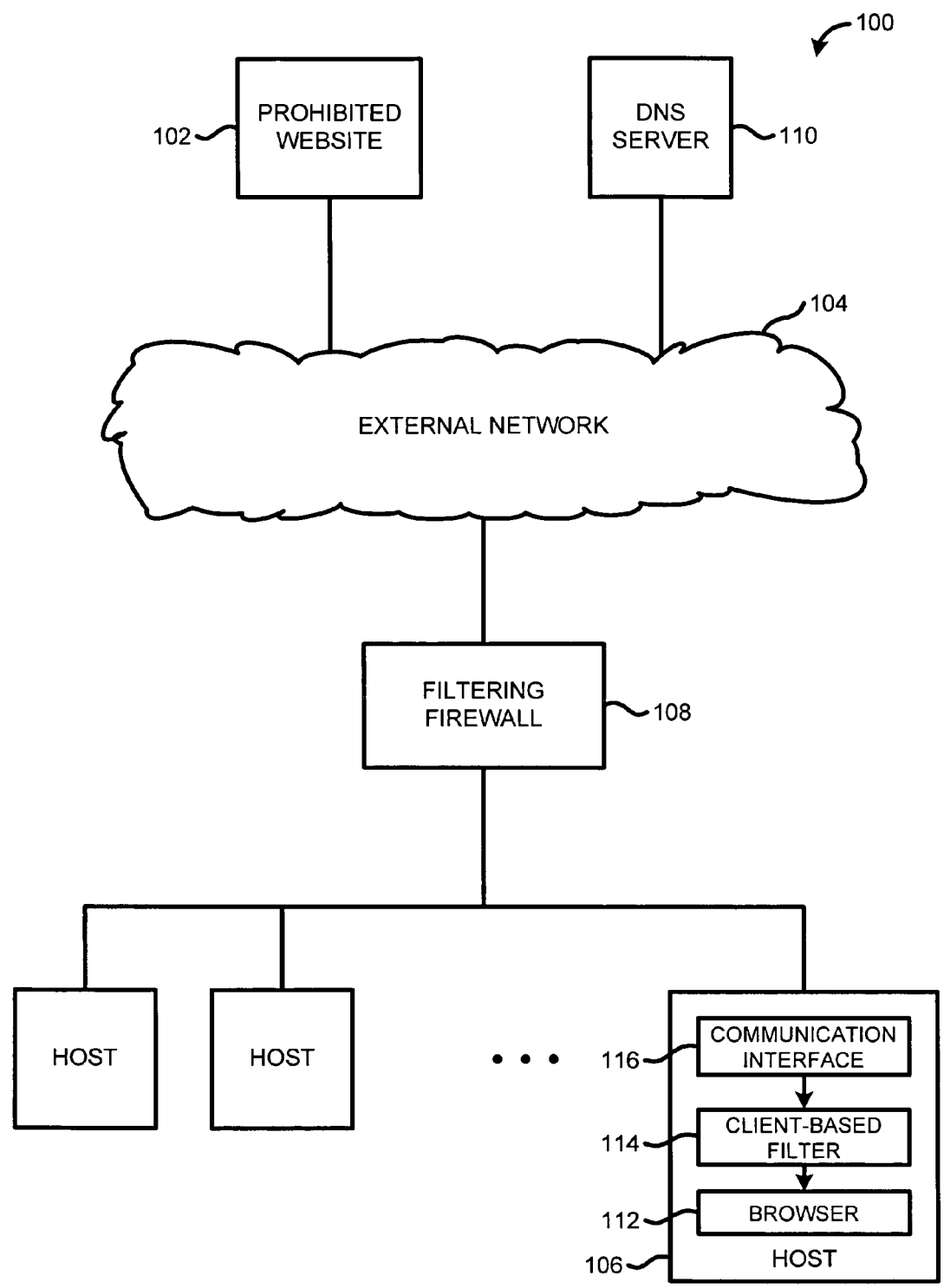
FIG. 1B illustrates an embodiment of a content filter deployed at a host in an internal network.

FIG. 1B illustrates an embodiment of a content filter deployed at a host in an internal network. FIG. 1B parallels FIG. 1A except that in FIG. 1B content filtering technologies (e.g., those employed in Symantec Client Security™) are deployed at each host (i.e. client) in the internal network. FIG. 1B additionally depicts the major components of such an internal host of the network. Specifically, host 106 is shown in FIG. 1B to include a web browser application 112 that is utilized by a user of host 106 to locate and view desired web pages. Host 106 also includes a client-based content filter 114 configured to prevent the user of host 106 from accessing prohibited websites, such as prohibited website 102. In addition, host 106 includes a communication interface 116 that enables host 106 to communicate with other hosts in the internal network of network environment 100 as well as with allowed hosts that are connected to external network 104, such as DNS server 110.

When a user of a host in a network (e.g., host 106 of FIGS. 1A and 1B) enters a URI or domain name into a browser (e.g., browser 112 of FIG. 1B) such as "http://www.prohibitedsite.com", the browser first resolves the domain portion of the URI into an IP address in order to open a TCP connection with a server associated with the domain/URI. The browser uses the local name resolution functions provided by the operating system on the host to do this. If the operating system does not already know the IP address, it queries a remote DNS server (e.g., DNS server 110 of FIGS. 1A and 1B) by sending out a DNS request packet containing the name it wants to resolve (e.g., www.prohibitedsite.com). Such a packet is sent out to a well-known port and usually to a well-known server and is sent unencrypted. The corresponding response back to the host is also from a well-known port, unencrypted, etc., and contains the IP address registered for that domain name and, in some embodiments, includes a "time to live" (TTL) value for which the response (i.e. the IP address) is valid. Intercepting and recording the request to and response from the DNS server in order to learn the association between domain names (or URI's or other identifiers) and corresponding IP addresses is disclosed. In some embodiments, a filtering device (e.g., filtering firewall 108 of FIG. 1A or client-based filter 114 of FIG. 1B) is configured to monitor and record the request to and response from the DNS server.

In some embodiments, the filtering device includes a DNS cache or other data structure and/or storage area configured to store domain names (or other identifiers) included in outgoing DNS requests and the associated IP addresses gleaned from the respective corresponding responses received by the internal host from the DNS server. FIG. 2 illustrates an embodiment of a DNS cache. In the example shown, for each DNS request, the domain name (or other identifier) for which an IP address was requested in the DNS request is stored in a first column of cache table 200; the corresponding IP address associated with each domain name, as learned by intercepting a DNS response to the DNS request associated with the domain name, is stored in a second column, and an associated TTL is recorded in a third column. In the example shown, the TTL is expressed as a number of hours, and in such an embodiment a timestamp or other time data not shown in FIG. 2 would be used to determine whether the entry is still valid in light of the TTL and the amount of time that has elapsed since the associated DNS cache entry was made. By forming such a DNS cache, the filtering device knows what IP address the host thinks is associated with a given domain name and the amount of time for which the IP address is valid for the domain name. In some embodiments, a DNS cache may include only the domain name and corresponding IP address and does not include the TTL value of the IP address. In the example of the DNS cache provided in FIG. 2, entry 202 of the DNS cache, for example, specifies that IP address 63.215.198.31 is associated with www.prohibitedsite.com for 4 hours. The domain name stored in such a DNS cache for an IP address may be a different value than might have been received had the filtering device issued its own reverse lookup on that IP address, e.g., if DNS resolution is not circular.

Upon receiving a response from a DNS server, the host subsequently uses the received IP address to open a TCP (or TCP/IP) connection. In some embodiments, the filtering device detects the attempt to open a web connection (e.g., a SYN packet sent to port 80) and attempts to validate it against its block list. Instead of querying a DNS server itself or relying on a list which may be out of date, the filter uses its local DNS cache to determine what domain name (or URI or other identifier) the host believes is associated with the IP address to which it is trying to connect. The filter is, for example, able to see that IP address 63.215.198.31 is bound to www.prohibitedsite.com and is able to correctly block access to this website if it is on the block list of the filter.

Such a filter is able to block correctly even in cases where a host has cached a local DNS result from a prior use. For example, a clever user may manually issue a DNS lookup (e.g., using nslookup or some other tool) and then wait an hour before attempting to connect. A good operating system will still have a copy of the resolution results and will not make the lookup again. If the filter was operating when the initial DNS request was made, however, it is still able to block. Since the filter observed the TTL value on the DNS response, it knows exactly how long that record in its DNS cache is valid. Even if a TTL value was not recorded, lacking a more recent response, it relies on the prior response, which is exactly what the operating system is doing.

Figure 3:
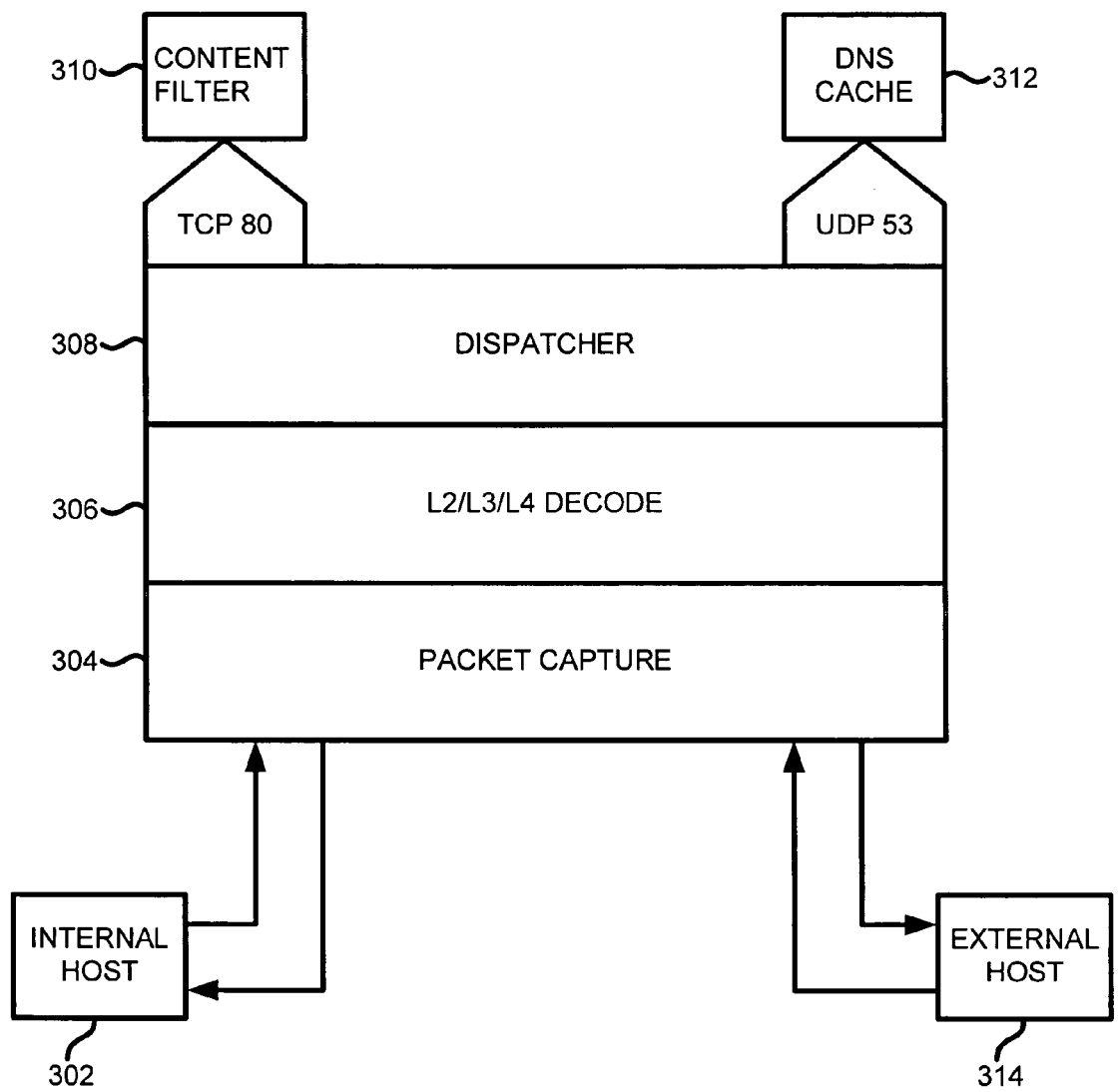
FIG. 3 illustrates an embodiment of a network content filter configured to use a DNS cache to prevent access to restricted external websites by internal hosts in a network.

FIG. 3 illustrates an embodiment of a network content filter configured to use a DNS cache to prevent access to restricted external websites by internal hosts in a network. In some embodiments, a content filter and associated DNS cache are installed on each network endpoint (i.e. host). In the example shown in FIG. 3, a packet transmitted from an internal host, such as internal host 302, is captured at 304. The packet undergoes an L2/L3/L4 decode at 306, which includes the determination of the communication protocol and destination port, destination IP address, etc., of the packet. If the packet corresponds to a web connection (e.g., destination port 80), dispatcher 308 sends the packet through content filter 310 to determine whether the destination of the packet is prohibited. In some embodiments, 308 includes determining whether the packet is an HTTP GET request and, if so, whether it comprises an attempt to download content from a prohibited site. If the destination is prohibited, the packet is not transmitted to its destination by dispatcher 308. In some embodiments, the user and/or host that initiated a blocked transmission is issued an alert that gives a notification that the connection attempt was blocked or unsuccessful. In some embodiments, a network administrator is alerted when a user and/or host in the network attempts to access a prohibited site and is blocked from accessing the site. If the destination of the packet is not prohibited, dispatcher 308 transmits (or permits other elements or components to transmit) the packet to its destination, e.g., external host 314. If the packet comprises a request sent to a DNS server (e.g., destination port 53), the domain name associated with the DNS request is recorded in DNS cache 312 prior to being dispatched by dispatcher 308 to its destination, and a corresponding return transmission from a DNS server that is a response to the DNS request is awaited.

Bi-directional packet capture functionality is provided in the embodiment illustrated in FIG. 3. Thus, a packet transmitted from an external host, such as external host 314, into the internal network is captured at 304. The packet undergoes an L2/L3/L4 decode at 306 which includes the determination of the communication protocol and source port of the packet. If a packet corresponds to a DNS response (e.g., source port 53), the IP address and in some embodiments the TTL value in the DNS response are stored in DNS cache 312 with the domain name that was previously captured and stored in the DNS cache during the corresponding DNS request by an internal host in the network. In some embodiments, DNS cache 200 of FIG. 2 corresponds to DNS cache 312 of FIG. 3. DNS cache 312 is used in conjunction with content filter 310 to determine the domain name associated with a destination IP address when, for instance, an internal host of the network attempts to open a TCP connection to a website using an IP address that was received from a DNS server in response to a corresponding DNS request by the host. The domain name corresponding to the destination IP address as determined from the DNS cache is checked against the content filter block list to determine whether the connection is blocked or allowed.

While in some of the embodiments described in detail herein a prohibited website is identified in a block list by a domain name, URI, or similar identifier associated with requests under the Hyper Text Transfer Protocol (HTTP) and an association between the domain name/URI and an associated IP address by which the prohibited site is identified under the Internet Protocol is determined and used to intercept requests to access the prohibited site, the techniques described herein may be applied to any situation in which access to an external resource is desired to be prohibited (or monitored or otherwise controlled) and there is a need to be able to recognize that a request under one network or other communication protocol in which request the external resource is identified by an identifier associated with that communication protocol is associated with the external resource as identified using a different identifier which is associated with the external resource under another communication protocol and which different identifier is used to define and/or implement the access restriction.

Figure 4:
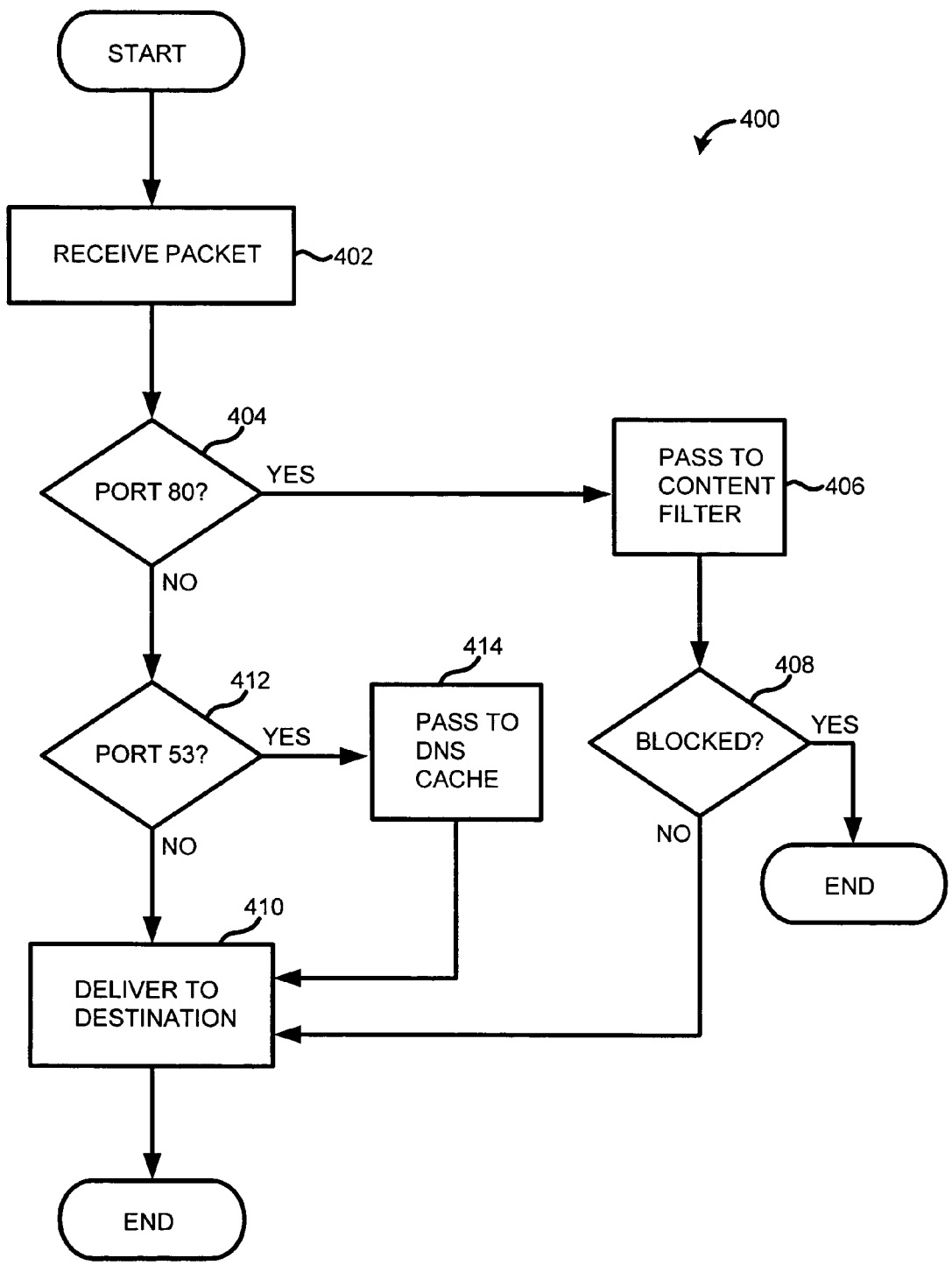
FIG. 4 illustrates an embodiment of a process used to process an outbound packet from an internal host.

FIG. 4 illustrates an embodiment of a process used to process an outbound packet from an internal host, such as internal host 302 of FIG. 3. In some embodiments, process 400 is performed by dispatcher 308 of FIG. 3 each time an outbound packet is received from an internal host, such as internal host 302. At 402, a packet is received from an internal host in a network. In some embodiments, 402 includes decoding the received packet. In other embodiments, the packet arrives at the dispatcher in at least partially decoded form (e.g., by operation of a partial decoding layer such as 306 of FIG. 3). It is determined at 404 whether the destination port of the packet received at 402 is port 80, which port is associated with the Hyper Text Transfer Protocol (http) typically used to retrieve content via the World Wide Web (www) (e.g., an HTTP GET request). If it is determined at 404 that the destination port of the packet received at 402 is port 80, the packet is passed to a content filter at 406 (e.g., content filter 310 of FIG. 3). At 408, it is determined whether the packet is to be blocked, i.e., whether the content filter to which the packet was passed at 406 has indicated the destination is included in the content filter block list. In some embodiments, 408 includes receiving from a content filter process, such as 310 of FIG. 3, an indication of whether the request is allowed or prohibited. As described above, in some embodiments the content filter (e.g., 310 of FIG. 3) resolves the destination IP address of the packet to its corresponding domain name utilizing its DNS cache (e.g., 312 of FIG. 3) and checks this domain name against its block list. If it is determined at 408 that the packet is to be blocked, the packet is not sent to its destination and process 400 ends. In some embodiments, if a packet is blocked, an alert or notification is sent to the originating user and/or host and/or to an administrator of the network. If it is determined at 408 that the packet is not to be blocked, at 410 the packet is delivered (or allowed to be delivered) to its destination and process 400 ends. If it is determined at 404 that the destination port of the packet received at 402 is not port 80, it is determined at 412 whether the destination port is port 53, which corresponds to a connection with a DNS server. If it is determined at 412 that the destination port of the packet is port 53 (e.g., the packet corresponds to a DNS request), the packet (or a copy thereof) is passed at 414 to a DNS cache, such as DNS cache 200 of FIG. 2 and/or DNS cache 312 of FIG. 3, prior to being delivered or allowed to be delivered to its destination at 410, after which process 400 ends. In some embodiments, the DNS cache to which the packet (or copy thereof) is passed in 414 records the domain name or other identifier associated with the DNS request. If it is determined at 412 that the destination port is not port 53 (i.e. the packet corresponds to neither a web (80) nor a DNS (53) request), the packet is transmitted to its destination at 410, after which process 400 ends.

Figure 5:
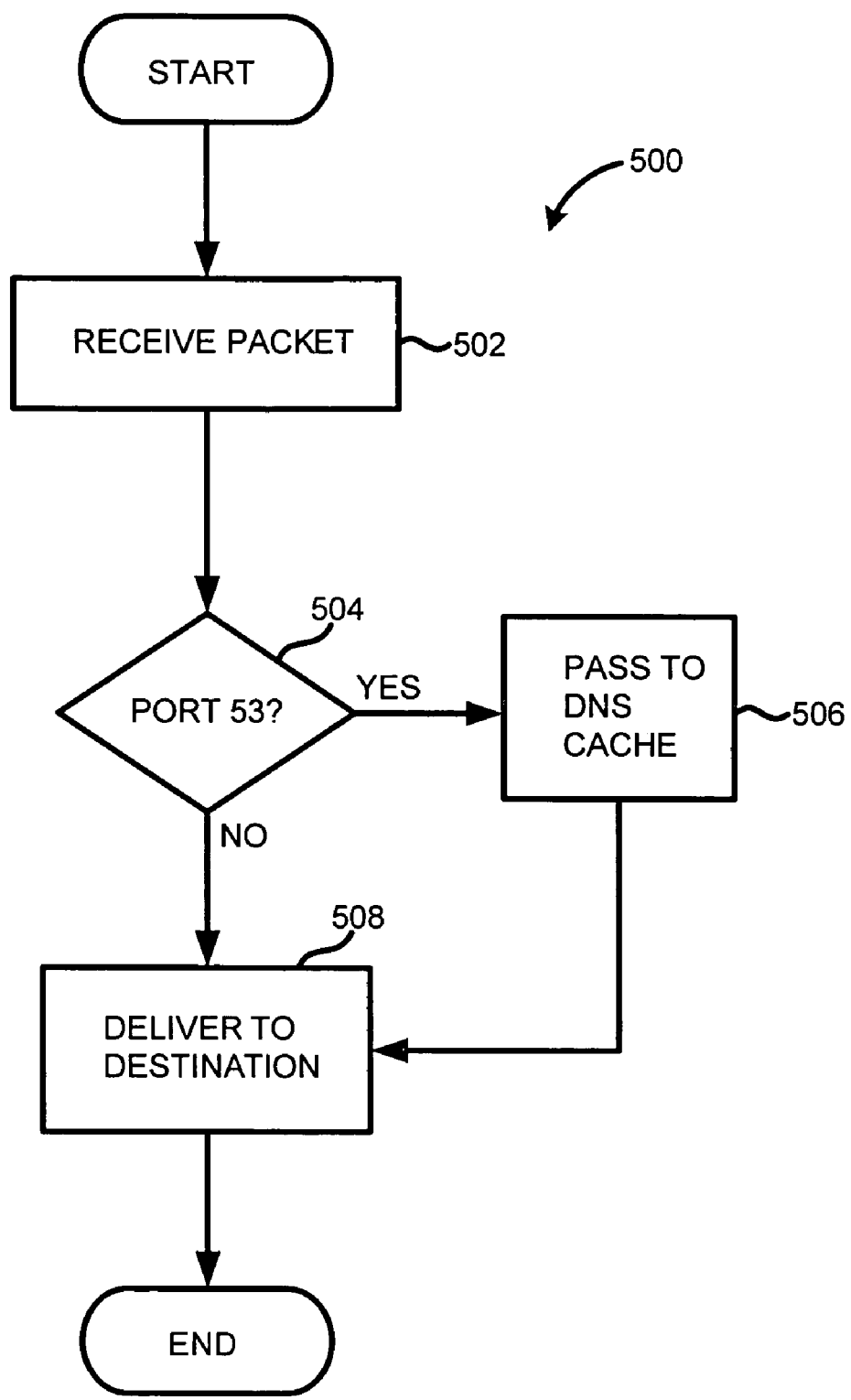
FIG. 5 illustrates an embodiment of a process used to process an inbound packet received from an external host.

FIG. 5 illustrates an embodiment of a process used to process an inbound packet received from an external host, such as external host 314 of FIG. 3. In some embodiments, process 500 is employed by dispatcher 308 of FIG. 3. At 502, a packet is received from an external host via an external network. In some embodiments, 502 includes decoding the received packet. In some embodiments, the packet is received at 502 in at least partially decoded form, e.g., from a decoding layer such as 306 of FIG. 3. It is determined at 504 whether the source port of the packet received at 502 is port 53, which corresponds to a DNS transmission. If it is determined at 504 that the source port of the packet received at 502 is port 53 (e.g., the packet corresponds to a DNS response), the packet (or a copy thereof) is passed to a DNS cache (e.g., 312 of FIG. 3) at 506 prior to being delivered (or allowed to be delivered) at 508 to its destination, e.g., an internal host in the network that issued a DNS request, the response of which corresponds to the packet received at 502. At 506, the IP address and, in some embodiments, the TTL value of the DNS response are recorded for the corresponding domain name, which, in some embodiments, is recorded in 414 of FIG. 4. If it is determined at 504 that the source port of the packet received at 502 is not port 53, the packet is delivered (or allowed to be delivered) to its destination at 508.

Figure 6:
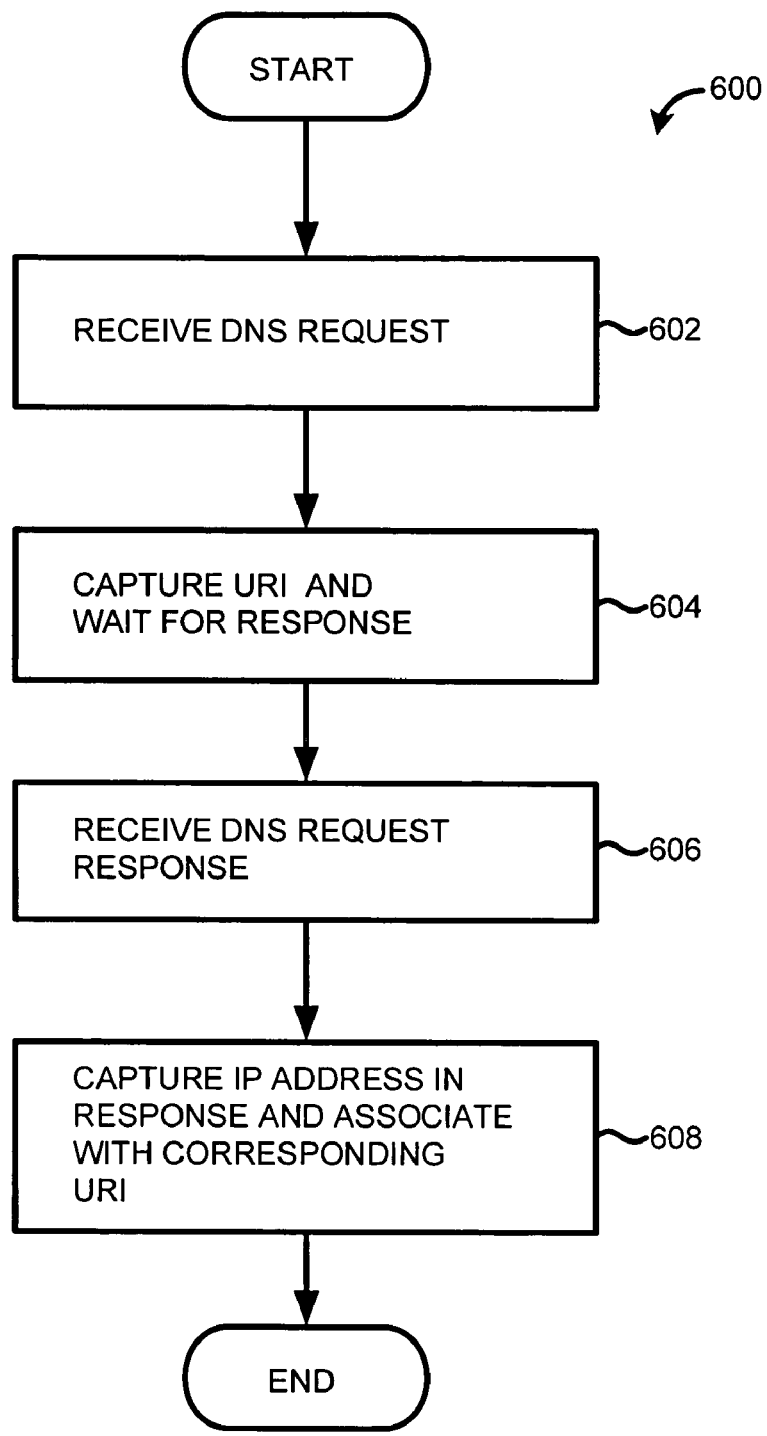
FIG. 6 illustrates an embodiment of a process used to cache DNS data.

FIG. 6 illustrates an embodiment of a process used to cache DNS data. In some embodiments, process 600 is used by DNS cache 312 of FIG. 3 to record and store DNS data. At 602, a DNS request (or a copy thereof) is received from an internal host in a network. In some embodiments, at 602 a DNS cache receives the request from a dispatcher such as dispatcher 308 of FIG. 3, e.g., a request sent to the DNS cache in 414 of FIG. 4. At 604, the URI (or domain name or other identifier) of the DNS request received at 602 is captured and stored, and a response from a DNS server to the DNS request of 602 is awaited. At 606, a response associated with the DNS request received at 602 is received. At 608, the IP address and, in some embodiments, a TTL value associated with the DNS response received at 606 is captured and stored with the corresponding URI captured at 604. In some embodiments, the DNS response received at 606 is provided by a dispatcher, such as 308 of FIG. 3, configured to send to the DNS cache a copy of traffic sent using port 53 as a source port, as in 506 of FIG. 5. In some embodiments, the URI (or domain name or other identifier), IP address, and TTL value are recorded and stored in the DNS cache in the manner illustrated in FIG. 2.

Figure 7:
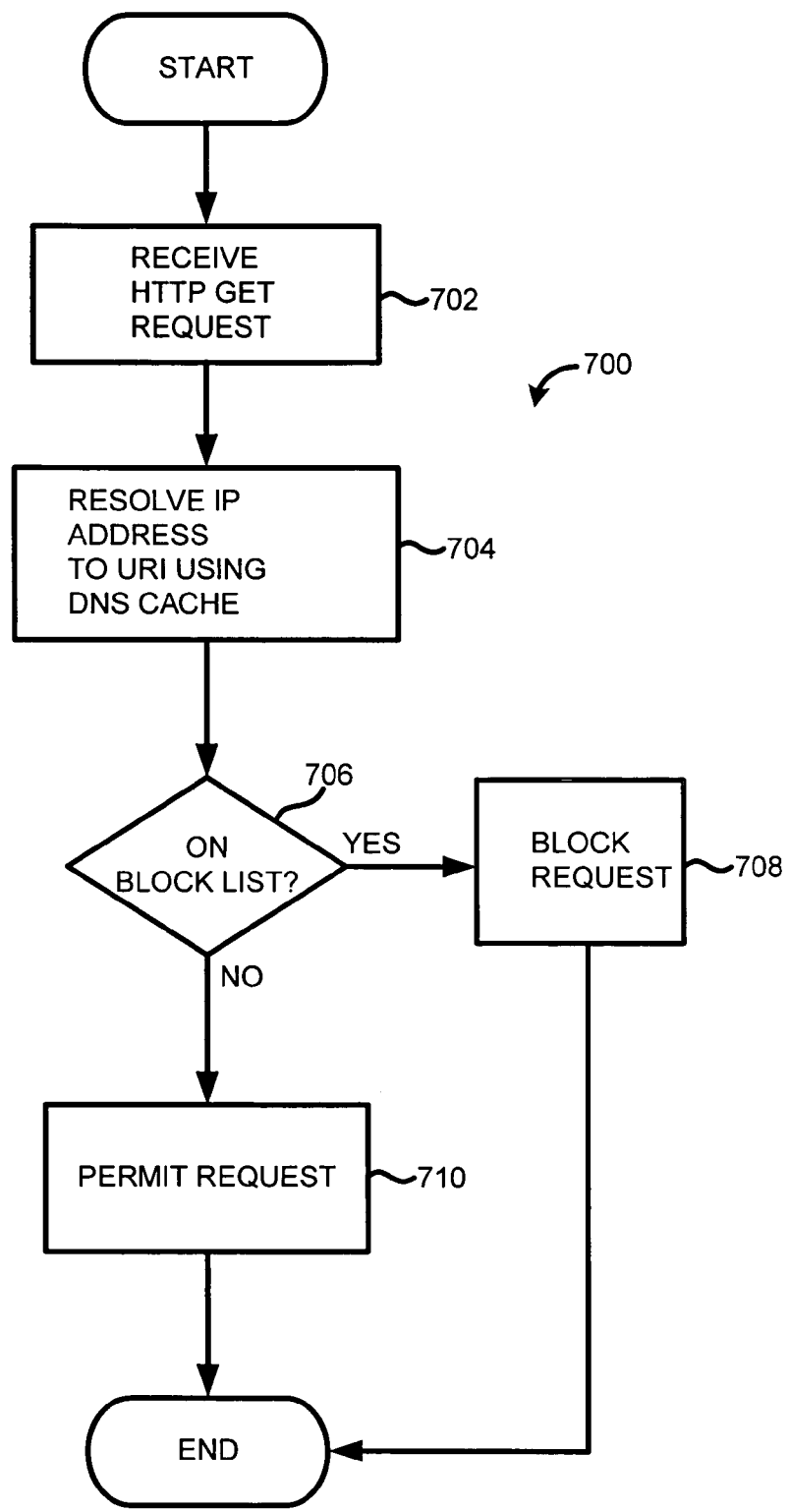
FIG. 7 illustrates an embodiment of a process used by a content filter.

FIG. 7 illustrates an embodiment of a process used by a content filter. In some embodiments, process 700 is used by content filter 310 of FIG. 3. Process 700 may be implemented by filtering firewall 108 of FIG. 1A and/or client-based filter 114 of FIG. 1B. At 702, an HTTP GET request is received from an internal host in the network. In some embodiments, the request (or a copy thereof) is received from a dispatcher, such as 308 of FIG. 3, sent by the dispatcher to the content filter as in 406 of FIG. 4. At 704, the IP address associated with the HTTP GET request of 702 is resolved to a URI (or domain name or other identifier) using an associated DNS cache (e.g., DNS cache 312 of FIG. 3). At 706, it is determined whether the URI of the resolved IP address is included in the content filter block list. In some embodiments, 706 includes checking the IP address against the block list. If it determined at 706 that the URI (and/or IP address) is included in the content filter block list, the HTTP GET request of 702 is blocked at 708 by the content filter, after which process 700 ends. In some embodiments, if a request is blocked at 708, an alert is transmitted to the user and/or host that originated the blocked request and/or to a network administrator. In some embodiments, 708 includes informing a dispatcher, such as 308 of FIG. 3, that the request should be blocked. If it is determined at 706 that the URI (and/or IP address) is not in the content filter block list, the request is permitted by the content filter at 710. In some embodiments, 710 includes informing a dispatcher, such as 308 of FIG. 3, that the request should be delivered to its destination.

The content filters described herein are also resilient against encrypted web access. While encrypted web access does not actually encrypt the IP address, it may encrypt the request (e.g., HTTP GET request) itself thus obscuring the URI. Since the content filter and DNS cache described herein rely only on DNS bindings learned at the network level from typically unencrypted DNS requests and responses, such application level encryption is irrelevant. Use of encrypted DNS could be overcome by configuring a local DNS server to cooperate with the filter in constructing a DNS cache such as those described above, e.g., by sending to the filter an unencrypted copy of an encrypted request received from and/or response sent to an internal host associated with the content filter.

As described herein, by employing a DNS cache local to the content filter, a robust and efficient content filter results. The content filter block list can be provided in domain name (or URI or other identifier) form and is not vulnerable to differences created by lack of circular resolution. Moreover, the excess DNS requests currently generated by filters using existing implementations are eliminated as is the need to update filter lists due to IP address changes. While the discussion herein focused on web access, it is possible to apply the techniques described herein to any other applications and/or protocols.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for blocking user access to an external resource, comprising:

monitoring, at a filter associated with a host in a protected network, a first request from and a corresponding response to the host to learn and store an association between a first identifier associated with an external resource under a first communication protocol and a second identifier associated with the external resource under a second communication protocol, wherein the first request is to a server external to the protected network;

dynamically creating or updating a cache using the stored first and second identifiers in the filter;

receiving, at the filter, a second request, sent under the second communication protocol, to access the external resource, wherein the external resource is identified in the second request by the second identifier;

using the stored first and second identifiers in the cache to determine that the second request is associated with the first identifier; and using the first identifier to determine whether access to the external resource in response to the second request is prohibited by checking the first identifier against a blocking list including a list of blocked external resources;

wherein the first identifier comprises an identifier entered by a user;

wherein the external resource includes content requested by the user; and wherein monitoring a first request from and a corresponding response to a host includes:
  receiving the first request;
  determining the first identifier from the first request;
  storing the first identifier;
  receiving the corresponding response;
  associating, at the filter, the corresponding response with the first request;

determining the second identifier and an associated time to live (TTL) value from the corresponding response; and storing the second identifier and associated time to live value in a manner that associates the second identifier and associated time to live value with the first identifier:

wherein the second identifier is stored in a manner that associates the second identifier with the first identifier for a length of time defined by the time to live value associated with the second identifier.

2. The method as recited in claim 1, wherein using the first identifier to determine whether access to the external resource is prohibited comprises checking whether the first identifier appears in a block list.

3. The method as recited in claim 2, further comprising blocking the second request if the first identifier appears in the block list.

4. The method as recited in claim 3, further comprising issuing an alert to the host if the second request is blocked.

5. The method as recited in claim 3, further comprising issuing an alert to an administrator if the second request is blocked.

6. The method as recited in claim 1, wherein monitoring a first request from and a corresponding response to a host includes:

receiving the first request;
determining the first identifier from the first request;
storing the first identifier;
receiving the corresponding response;
associating the corresponding response with the first request;
determining the second identifier from the corresponding response; and
storing the second identifier in a manner that associates the second identifier with the first identifier.

7. The method as recited in claim 6, wherein receiving the first request includes:

capturing a packet associated with the first request; and
at least partially decoding the packet.

8. The method as recited in claim 1, wherein the first request comprises a Domain Name System (DNS) request.

9. The method as recited in claim 1, wherein the first request comprises a Domain Name System (DNS) request if a destination port associated with the first request is Port 53.

10. The method as recited in claim 1, wherein the corresponding response comprises a Domain Name System (DNS) response.

11. The method as recited in claim 1, wherein the corresponding response comprises a Domain Name System (DNS) response if a source port associated with the corresponding response is Port 53.

12. The method as recited in claim 1, wherein the first identifier comprises a domain name.

13. The method as recited in claim 1, wherein the first identifier comprises a Uniform Resource Identifier (URI).

14. The method as recited in claim 1, wherein the first communication protocol comprises a Hyper Text Transfer Protocol (HTTP).

15. The method as recited in claim 1, wherein the second identifier comprises an Internet Protocol (IP) address.

16. The method as recited in claim 1, wherein the second communication protocol comprises an Internet Protocol (IP).

17. The method as recited in claim 1, wherein the second communication protocol comprises a Transmission Control Protocol (TCP).

18. The method as recited in claim 1, wherein the second request comprises an HTTP GET request.

19. The method as recited in claim 1, wherein the second request comprises an HTTP GET request if a destination port of the second request is Port 80.

20. A system for blocking user access to an external resource, comprising:

a processor configured to:
  monitor, at a filter associated with a host in a protected network, a first request from and a corresponding response to the host to learn and store an association between a first identifier associated with an external resource under a first communication protocol and a second identifier associated with the external resource under a second communication protocol, wherein the first request is to a server external to the protected network;
  dynamically create or update a cache using the stored first and second identifiers in the filter;
  receive, at the filter, a second request, sent under the second communication protocol, to access the external resource, wherein the external resource is identified in the second request by the second identifier;
  use the stored first and second identifiers in the cache to determine that the second request is associated with the first identifier; and
  use the first identifier to determine whether access to the external resource in response to the second request is prohibited by checking the first identifier against a blocking list including a list of blocked external resources; and
a communication interface coupled to the processor and configured to receive the first request, the corresponding response, and the second request;
wherein the first identifier comprises an identifier entered by a user;
wherein the external resource includes content requested by the user; and
wherein to monitor a first request from and a corresponding response to a host includes to:
  receive the first request;
  determine the first identifier from the first request;
  store the first identifier;
  receive the corresponding response;
  associate, at the filter, the corresponding response with the first request;
  determine the second identifier and an associated time to live (TTL) value from the corresponding response; and
  store the second identifier and associated time to live value in a manner that associates the second identifier and associated time to live value with the first identifier:
wherein the second identifier is stored in a manner that associates the second identifier with the first identifier for a length of time defined by the time to live value associated with the second identifier.

21. The system as recited in claim 20 further comprising a memory coupled to the processor configured to store the first identifier and the second identifier.

22. The system as recited in claim 20, wherein the processor is associated with a firewall.

23. The system as recited in claim 20, wherein the processor is associated with the host.

24. The system as recited in claim 20, wherein to receive the first request includes to:

capture a packet associated with the first request; and
at least partially decode the packet.

25. The system as recited in claim 20, wherein the first identifier comprises a Uniform Resource Identifier (URI).

26. The system as recited in claim 20, wherein the first communication protocol comprises a Hyper Text Transfer Protocol (HTTP).

27. The system as recited in claim 20, wherein the second identifier comprises an Internet Protocol (IP) address.

28. The system as recited in claim 20, wherein the second communication protocol comprises a Transmission Control Protocol (TCP).

29. A non-transitory computer readable storage medium having embodied thereon computer instructions which when executed by a computer cause the computer to perform a method comprising:
monitoring, at a filter associated with a host in a protected network, a first request from and a corresponding response to the host to learn and store an association between a first identifier associated with an external resource under a first communication protocol and a second identifier associated with the external resource under a second communication protocol, wherein the first request is to a server external to the protected network;
dynamically creating or updating a cache using the stored first and second identifiers in the filter;
receiving, at the filter, a second request, sent under the second communication protocol, to access the external resource, wherein the external resource is identified in the second request by the second identifier;
using the stored first and second identifiers in the cache to determine that the second request is associated with the first identifier; and
using the first identifier to determine whether access to the external resource in response to the second request is prohibited by checking the first identifier against a blocking list including a list of blocked external resources;
wherein the first identifier comprises an identifier entered by a user;
wherein the external resource includes content requested by the user; and
wherein monitoring a first request from and a corresponding response to a host includes:
receiving the first request;
determining the first identifier from the first request;
storing the first identifier;
receiving the corresponding response;
associating, at the filter, the corresponding response with the first request;
determining the second identifier and an associated time to live (TTL) value from the corresponding response; and
storing the second identifier and associated time to live value in a manner that associates the second identifier and associated time to live value with the first identifier;
wherein the second identifier is stored in a manner that associates the second identifier with the first identifier for a length of time defined by the time to live value associated with the second identifier.

30. The non-transitory computer program product as recited in claim 29, wherein receiving the first request includes:
capturing a packet associated with the first request; and
at least partially decoding the packet.

* * * * *